United States Patent
Miyazaki et al.

(10) Patent No.: US 6,520,232 B1
(45) Date of Patent: Feb. 18, 2003

(54) PNEUMATIC TIRE WITH MONOFILAMENT METALLIC BELT CORDS

(75) Inventors: Shinichi Miyazaki, Kobe (JP); Takeshi Ohta, Toyonaka (JP); Kazumi Yamazaki, Osaka (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/612,377

(22) Filed: Jul. 7, 2000

(30) Foreign Application Priority Data

| Jul. 7, 1999 | (JP) | 11-193641 |
| Jul. 23, 1999 | (JP) | 11-209492 |
| Jul. 28, 1999 | (JP) | 11-213935 |

(51) Int. Cl.⁷ .............. B60C 9/18; B60C 9/20; B60C 9/22; B60C 9/00
(52) U.S. Cl. .......... 152/527; 152/451; 152/526; 152/531
(58) Field of Search ............. 152/526, 527, 152/531, 451

(56) References Cited

U.S. PATENT DOCUMENTS 3,802,982 A * 4/1974 Alderfer ............ 152/527 X

FOREIGN PATENT DOCUMENTS

| AT | 335863 B | 4/1977 | |
| EP | 0627331 A1 | 12/1994 | |
| EP | 0672546 A1 | 9/1995 | |
| JP | 06255313 A * | 9/1994 | 152/527 |
| WO | WO9928547 A1 | 6/1999 | |
| WO | WO0071809 A1 | 11/2000 | |

OTHER PUBLICATIONS

Patent Abstracts of Japan, vol. 018, No. 653 (M–1720), JP6–255313A (Yokohama Rubber Co. Ltd.), Sep. 13, 1994.
Patent Abstracts of Japan, vol. 2000, No. 13, JP2000–301913A (Yokohama Rubber Co. Ltd.), Oct. 31, 2000.

* cited by examiner

Primary Examiner—Adrienne C. Johnstone
(74) Attorney, Agent, or Firm—Birch, Stewart, Kolasch & Birch, LLP (57) ABSTRACT

A pneumatic tire comprises a belt disposed radially outside a carcass in a tread portion, the belt comprising two cross plies of monofilament metallic cords laid at angles of from 15 to 30 degrees with respect to the circumferential direction of the tire, each monofilament cord composed of a waved single filament, the filament having a circular sectional shape having a diameter in a range of from 0.40 to 0.50 mm, or alternatively a non-circular sectional shape having an aspect ratio in a range of from 0.65 to 0.95 and a cross-sectional area in a range of 0.09 to 0.20 sq.mm.

6 Claims, 8 Drawing Sheets

PNEUMATIC TIRE WITH MONOFILAMENT METALLIC BELT CORDS

BACKGROUND OF THE INVENTION

1. Field of the Invention

The present invention relates to a pneumatic tire with an improved belt structure being capable of reducing the tire weight without sacrificing the steering stability, ride comfort, durability and the like.

2. Description of Related Art

In pneumatic tires especially radial tires, a tread reinforcing belt, which is composed of cords each made of twisted steel filaments, is widely used.

In recent years, on the other hand, there is a great demand for a lightwaight tire to save energy.

In order to reduce the amount of steel in a tread reinforcing belt, a trial has been made using a relatively thick steel filament as a cord because such a monofilament cord has a less steel amount than a multifilament cord when the bending rigidity of the monofilament cord is set at the same degree as the multifilament cord. However, the elongation of such monofilament cord when loaded is very small and liable to break. Thus, the durability of the belt is not good, and the cornering force becomes insufficient and the steering stability is lowered. If the thickness is increased in order to avoid breaking, the bending rigidity suddenly increases, and ride comfort is greatly decreased. Thus, it is very difficult to use a monofilament cord in a tread reinforcing belt.

SUMMARY OF THE INVENTION

It is therefore, an object of the present invention to provide a pneumatic tire, in which a filament having a specific size being waved in a specific manner is used as a belt cord to achieve a weight reduction without sacrificing the durability, ride comfort, steering stability and the like.

According to the present invention, a pneumatic tire comprises a belt disposed radially outside a carcass in a tread portion, the belt comprising two cross plies of monofilament metallic cords laid at angles of from 15 to 30 degrees with respect to the circumferential direction of the tire, each monofilament cord composed of a waved single filament, the filament having a circular sectional shape having a diameter in a range of from 0.40 to 0.50 mm, or alternatively a non-circular sectional shape having an aspect ratio in a range of from 0.65 to 0.95 and a cross-sectional area in a range of 0.09 to 0.20 sq.mm.

Embodiments of the present invention will now be described in detail in conjunction with the accompanying drawings.

DETAILED DESCRIPTION OF THE INVENTION

Figure 1:
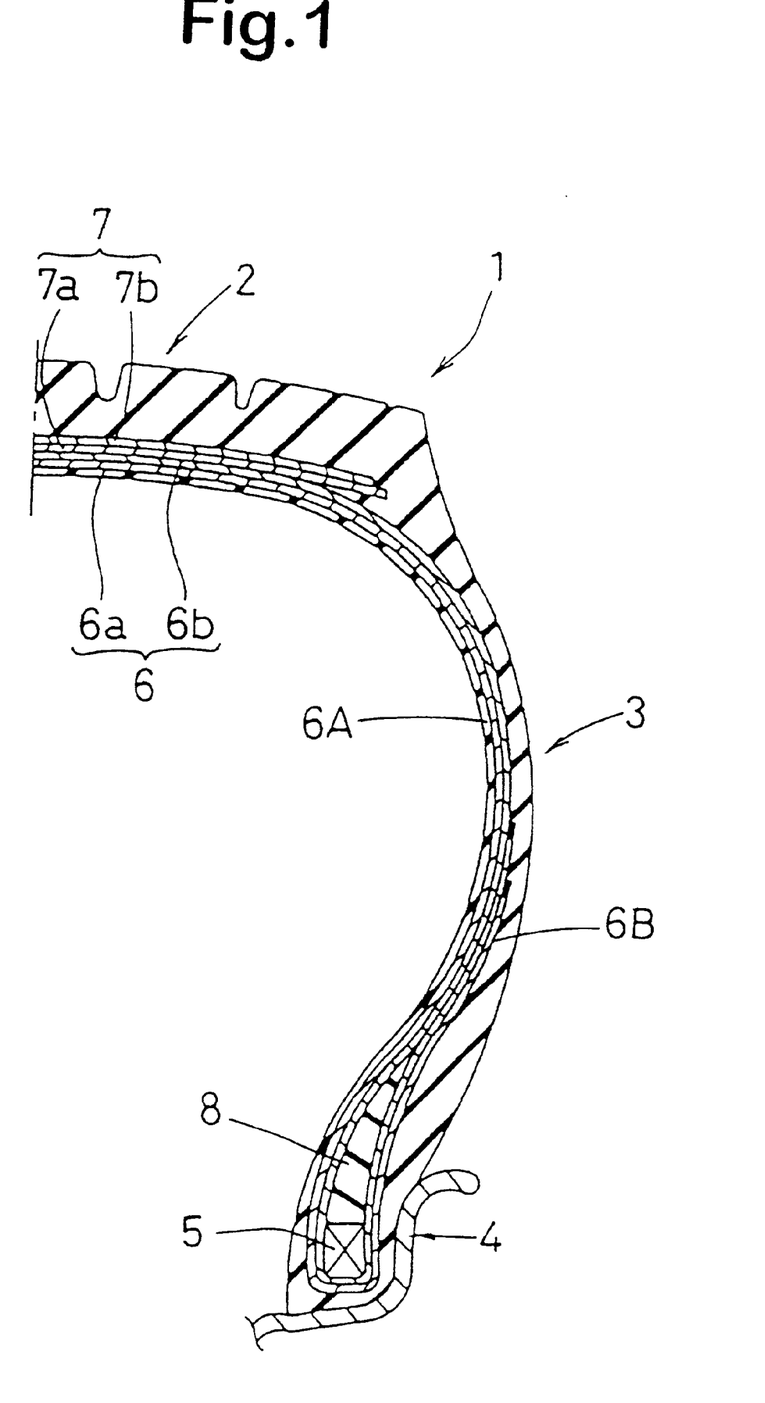
FIG. 1 is a cross sectional view of a pneumatic tire according to the present invention.
Figure 2:
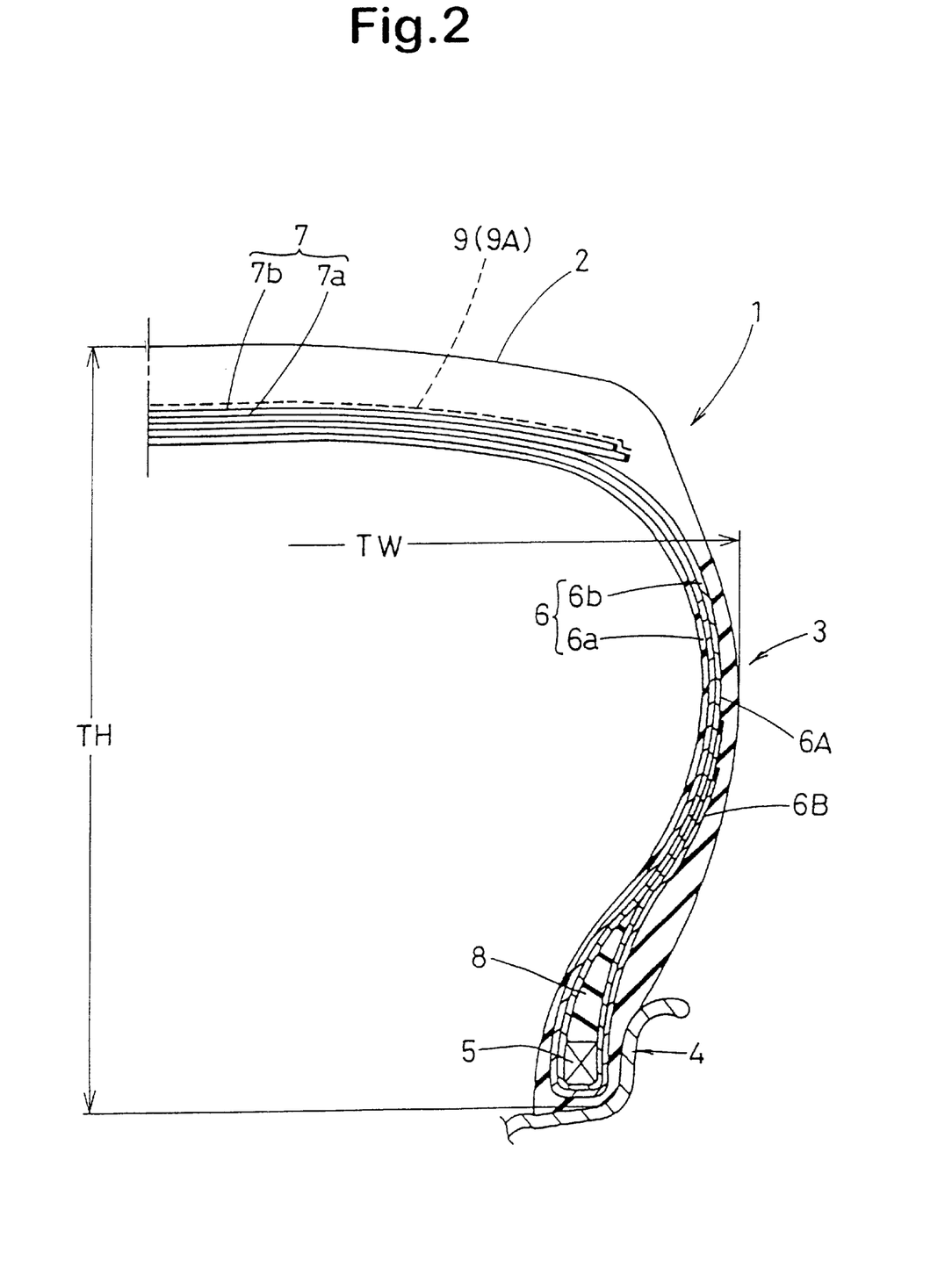
FIG. 2 is a cross sectional view of a pneumatic tire according to the present invention.

Pneumatic tire 1 according to the present invention comprises a tread portion 2, a pair of axially spaced bead portions 4 each with a bead core 5 therein, a pair of sidewall portions 3 extending therebetween, a carcass 6 extending between the bead portions 4, and a belt 7 disposed radially outside the carcass 6 in the tread portion 2. In FIG. 1, the pneumatic tire 1 according to the present invention is a radial tire for passenger cars of which aspect ratio (tire section height TH/section width TW) is 0.7. In FIG. 2, the pneumatic tire 1 according to the present invention is also a radial tire for passenger cars of which aspect is 0.65.

The carcass 6 comprising at least one ply of cords arranged radially at an angle of from 75 to 90 degrees with respect to the circumferential direction of the tire and extending between the bead portions 4 through the tread portion 2 and sidewall portions 3 and turned up around the bead core 5 in each bead portion 4 to form a pair of turned up portions 6B and a main portion 6A therebetween. In the embodiments shown in FIGS. 1 and 2, the carcass 6 is composed of two plies 6a and 6b both turned up around the bead cores 5.

For the carcass cords, organic fiber cords made of twisted organic fibers and multifilament steel cords made of twisted steel filaments can be used. For the material of the organic fibers, aliphatic polyamide such as Nylon, rayon, aromatic polyamide, polyvinylalcohol (for example, VINYLON), polyethylene terephthalate such as polyester, polyethylene naphthalate such as polyethylene 2–6 naphthalate and the like can be used.

The bead portions 4 are each provided between the carcass turned up portion 6B and main portion 6A with a bead apex 8. The bead apex 8 is made of hard rubber tapering radially outward and extending radially outward from the bead core 5.

Belt

The belt comprises a breaker 7 and optionally a band 9. In FIG. 1, the band 9 is not provided, but it is possible to provide a band 9. In FIG. 2, the band 9 is provided, but it is possible not to provide the band 9.

Band

The band 9 is disposed radially outside the breaker 7 and made of parallel cords or alternatively windings of at least one cord, wherein the cord angle is a small value of less than 10 degrees, usually less than 5 degrees with respect to the circumferential direction of the tire.

The band 9 can be formed as a so called edge band, namely, a band composed of a pair of axially spaced pieces disposed on the axial edges of the breaker, or a so called full band disposed over the breaker, or a combination of the full band and edge band.

For the band cord 11, an aliphatic polyamide (such as nylon) fiber cord, aromatic polyamide fiber cord, polyvinylalcohol (for example VINYLON) fiber cord, polyethylene terephthalate (such as polyester) fiber cord, polyethylene naphthalate (such as polyethylene 2–6 naphthalate) fiber cord, and a hybrid cord of aliphatic polyamide fiber and aromatic polyamide fiber can be used.

In order to increase the production efficiency, the band 9 can be formed by spirally winding a tape 12 of rubberized parallel band cords 11. Preferably, the tape 12 has a width of from 6 to 15 mm, and several cords 11 are embedded along the length thereof.

Breaker

The breaker 7 comprises at least two cross breaker plies 7a and 7b of parallel cords 10 laid at angles of from 15 to 30 degrees with respect to the circumferential direction of the tire.

According to the present invention, the breaker cords 10 are monofilament metallic cords, that is, each cord 10 is compose of a single steel filament, and the filament is waved two-dimensionally or three-dimensionally.

First Breaker Example

Figure 3:
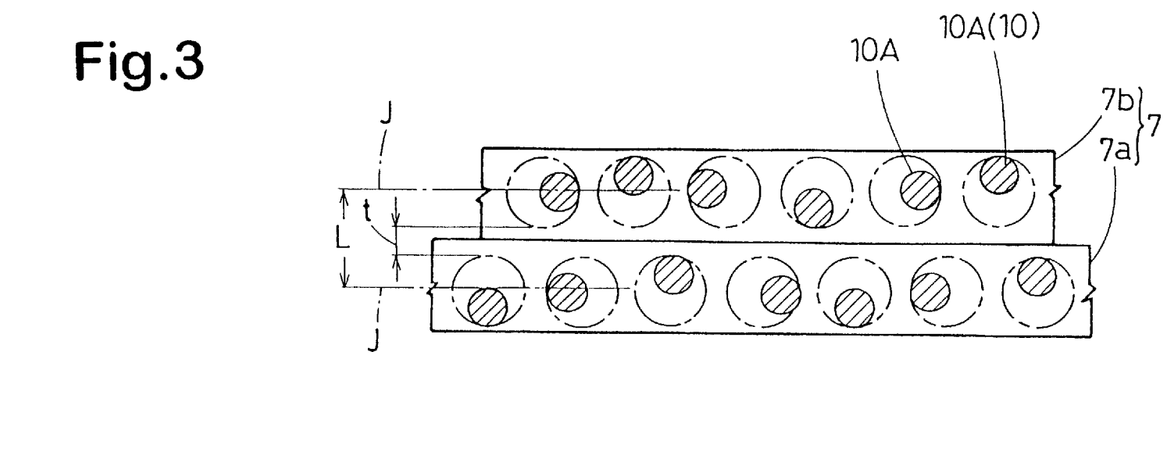
FIG. 3 is a cross sectional view of an example of the breaker.
Figure 4:
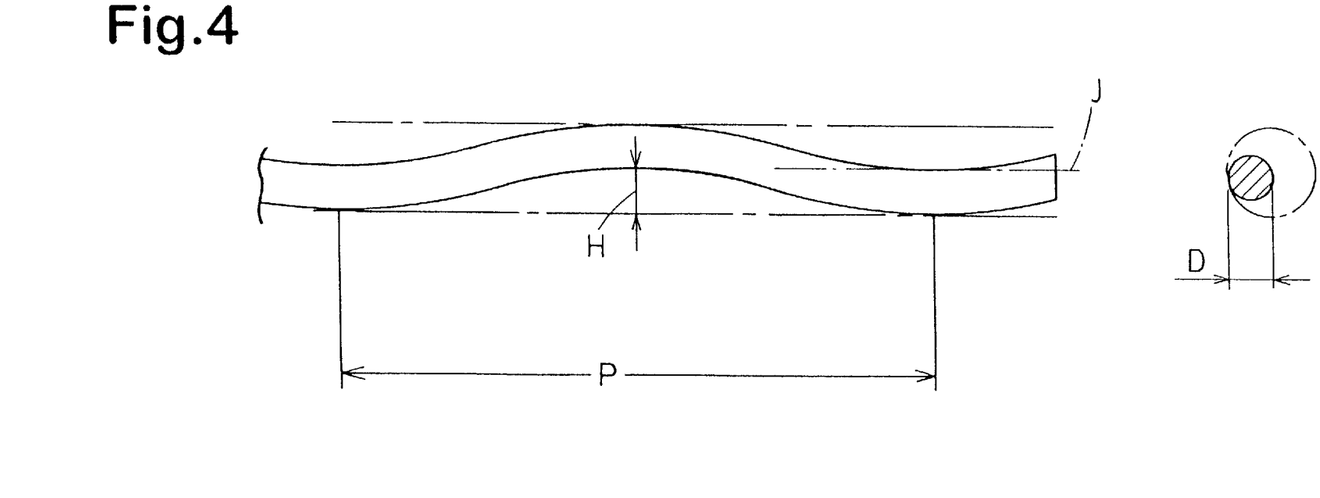
FIG. 4 is a diagram for explaining the spiral waving of the cord thereof.

FIG. 3 shows a first example of the breaker 7. FIG. 4 shows a first example of the breaker cord 10 which is composed of a filament 10A having a circular sectional shape whose diameter D is in the range of from 0.40 to 0.50 mm. In this example, the filament 10A is waved spirally along the length thereof. The wave pitch P or spiral pitch is in the range of not less than 14.0 mm. The wave height H is in the range of from 0.002 to 0.02 times the pitch P.

The rupture strength of the cord 10 is set in the range of not less than 3300 N/sq.mm.

Each breaker ply 7a, 7b has a rigidity index BM set in the range of from 100 to 300.

Here, the rigidity index BM is defined as the product MxNxL of the bending rigidity M (g cm) of a cord 10, the cord count N per 5 cm width of the ply and the distance L (cm) between the cord center J of the ply 7a and that of the ply 7b.

Second Breaker Example

Figure 5:
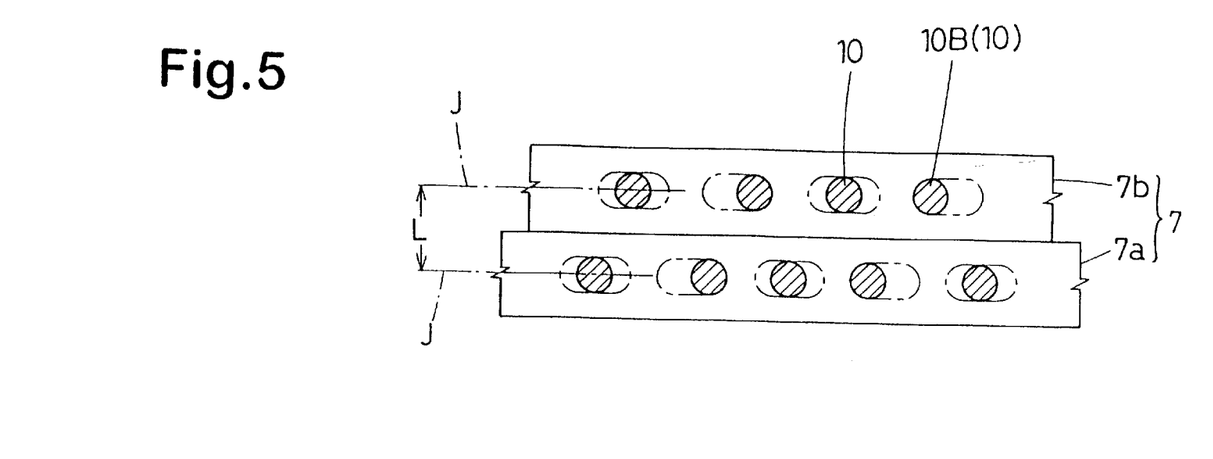
FIG. 5 is a cross sectional view of another example of the breaker.
Figure 6:
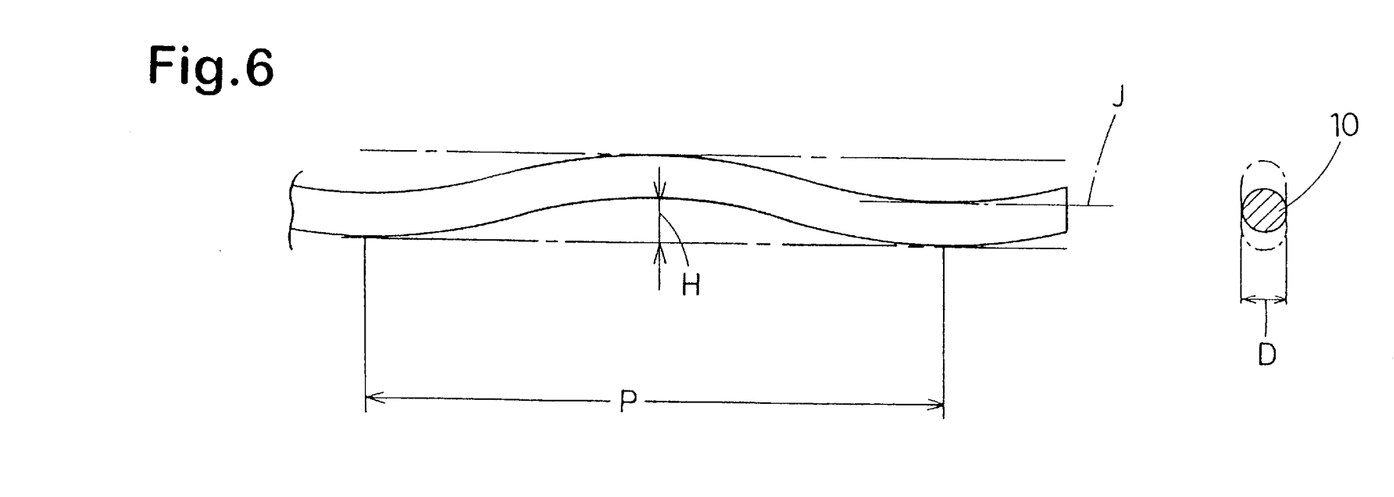
FIG. 6 is a diagram for explaining the two-dimensional waving of the cord thereof.

FIG. 5 shows a second example of the breaker 7. FIG. 6 show a second example of the breaker cord 10 which is Each breaker ply 7a, 7b has a rigidity index BM set in the range of from 100 to 300.

Comparison Test

Test tires of size 175/70R13 (standard rim: 5JX13) having the structure shown in FIG. 1 and specifications shown in Table 1 were made and tested for the tire weight, durability, steering stability, ride comfort and tire strength. The test results are shown in Table 1.

(1) Tire Weight

The weight of a tire is indicated by an index based on Prior art tire (Pr.) being 100. The smaller the index, the lighter the weight.

(2) Durability

Figure 8:
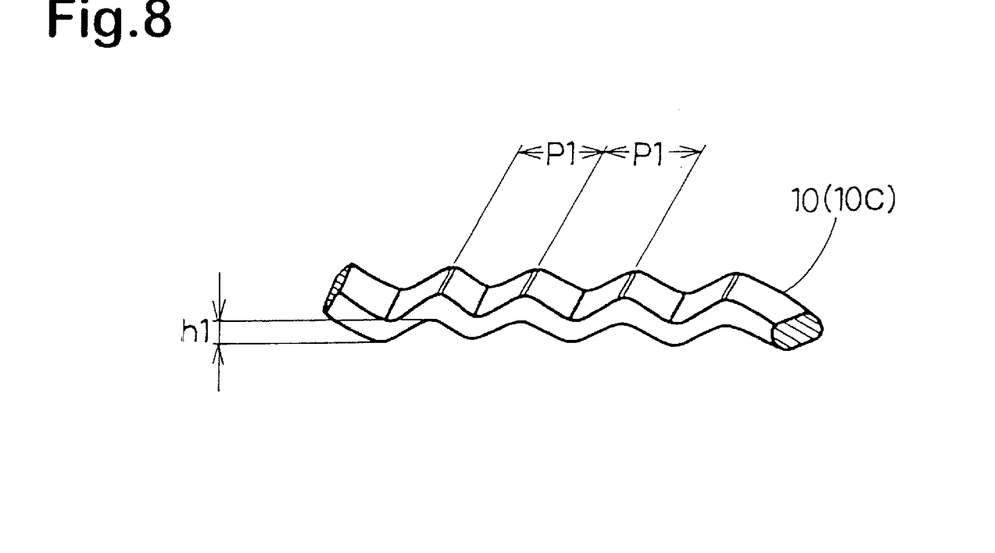
FIG. 8 is a perspective view of the cord thereof showing its two-dimensional waving.

A 2000 cc passenger car provided on all the wheels with test tires was run 500 laps in a figure-8 test course having diameters of 14 meters, and then the tires were cut-open inspected to count breakages of the cords. (Tire pressure 200 kPa) The number of breakages is indicated by an index based on Prior art tire (Pr.) being 100. The smaller the index, the better the durability.

(3) Steering Stability

During running the passenger car on a dry asphalt road in a tire test course, the test driver evaluated the steering response, rigidity and road grip into ten ranks. The higher the value, the better the steering stability.

(4) Ride Comfort

During running the passenger car on dry rough roads including washboard asphalt road, stone paved road and gravel road, harshness, thrust and damping were evaluated into ten ranks by the test driver. The larger the value, the better the ride comfort.

(5) Tire Strength

According to the Japanese Industrial Standard JIS-D4230, a plunger test was made and the breaking energy was measured under a standard pressure of 200 kPa. The result is indicated by an index based on Prior art tire (Pr.) being 100. The larger the index, the better the strength.

TABLE 1

| Tire | Pr.A1 | Ref.A1 | Ref.A2 | Ref.A3 | Ref.A4 | Ex.A1 | Ex.A2 | Ex.A3 | Ex.A4 | Ex.A5 | Ex.A6 |
| --- | --- | --- | --- | --- | --- | --- | --- | --- | --- | --- | --- |
| Breaker cord | multi | multi | multi | multi | multi | mono | mono | mono | mono | mono | mono |
| Number of filament | 5 | 5 | 5 | 5 | 5 | 1 | 1 | 1 | 1 | 1 | 1 |
| Filament Dia. D (mm) | 0.25 | 0.38 | 0.53 | 0.42 | 0.42 | 0.4 | 0.42 | 0.42 | 0.42 | 0.45 | 0.5 |
| Waving | — | spiral | spiral | spiral | spiral | spiral | 2-D wave | spiral | spiral | spiral | spiral |
| Wave pitch P (mm) | — | 18 | 25 | 8 | 20 | 19 | 20 | 20 | 20 | 21 | 24 |
| Wave height H (mm) | — | 0.16 | 0.22 | 0.18 | 0.45 | 0.17 | 0.18 | 0.18 | 0.18 | 0.19 | 0.21 |
| Bending rigidity M (g cm) | 28 | 29 | 89 | 42 | 42 | 35 | 42 | 42 | 42 | 56 | 84 |
| Cord strength (N) | 601 | 375 | 684 | 432 | 418 | 408 | 438 | 444 | 499 | 501 | 608 |
| Strength/section area (N/sq.mm) | 2450 | 3300 | 3100 | 3117 | 3016 | 3250 | 3160 | 3200 | 3600 | 3150 | 3100 |
| Cord count N/5 cm ply width | 30 | 42 | 32 | 42 | 42 | 46 | 42 | 42 | 42 | 38 | 32 |
| Distance L (cm) | 0.12 | 0.095 | 0.115 | 0.1 | 0.1 | 0.097 | 0.1 | 0.1 | 0.1 | 0.105 | 0.11 |
| Rigidity index BM | 101 | 115 | 328 | 176 | 176 | 156 | 176 | 176 | 176 | 223 | 296 |
| Tire weight | 100 | 89 | 97 | 92 | 92 | 92 | 92 | 92 | 92 | 93 | 93 |
| Durability | 100 | 160 | 104 | 220 | 200 | 80 | 60 | 40 | 40 | 52 | 92 |
| Steering stability | 7 | 4 | 9 | 8 | 8 | 8 | 8 | 8 | 7 | 9 | 9 |
| Ride comfort | 7 | 8 | 4 | 8 | 8 | 8 | 8 | 8 | 9 | 7 | 6 |
| Tire strentgh | 100 | 87 | 121 | 101 | 97 | 104 | 102 | 103 | 116 | 106 | 108 | composed of a filament 10B having a circular sectional shape whose diameter D is in the range of from 0.40 to 0.50 mm. In this example, the filament 10B is waved substantially on a surface parallel with the face of the ply like a sine curve. The wave pitch P or one cycle of the wave is in the range of not less than 14.0 mm. The wave height H is in the range of from 0.002 to 0.02 times the pitch P.

In the first and second examples of the breaker: If the diameter D is less than 0.40 mm, as the rigidity of the cord 10 decreases, it becomes difficult for the belt to provide an essential cornering power and steering stability. If the diameter D is more than 0.50 mm, the residual stress of the cord increases, and the cord durability decreases. In addition, if the diameter D is more than 0.50 mm, as the rigidity of the filament becomes very high for the belt cord, it is necessary to magnify the wave to decrease the rigidity. If the wave is magnified, however, the durability, strength and resistance to fatigue are decreased. Further, as the cords approach each other partially and ununiformly, a rubber separation failure is liable to occur. If the wave pitch P is less than 14 mm, the cord durability is easily decreased by cord deformation during running. If the wave height H is more than 0.02 times the pitch P, the cord strength and fatigue resistance are liable to decrease as the filament is thick. In case of FIG. 3, as the rubber thickness (t) between the cords decreases accordingly, a ply separation failure is be liable to occur.

If the wave height H is less than 0.002 times the pitch P and/or the pitch P is more than 50 mm, the effects of the waving can not be obtained.

If the breaker rigidity index BM is less than 100, the belt rigidity becomes insufficient. If the breaker rigidity index BM is more than 300, the belt rigidity becomes excessively high and ride comfort is deteriorated.

Third Breaker Example

Figure 7:
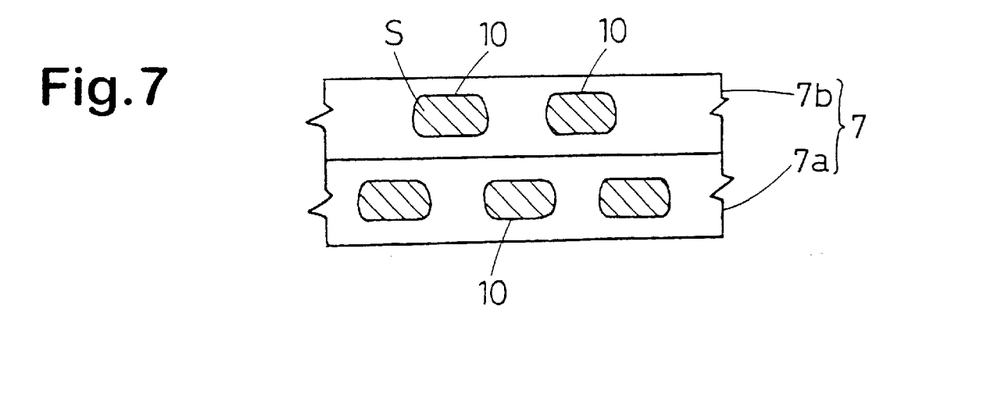
FIG. 7 is a cross sectional view of still another example of the breaker.
Figure 9:
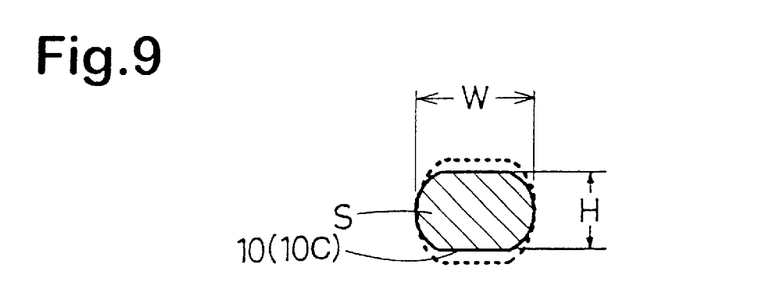
FIG. 9 is a cross sectional view thereof.

FIG. 7 shows a third example of the breaker 7. FIGS. 8 and 9 show a third example of the breaker cord 10 which is composed of a filament 10C having a rectangular sectional shape whose minor axis and major axis lie along the tire radial direction and a normal direction thereto, respectively. Here, the "rectangular shape" means a rounded rectangle whose corners are chamfered rather than a rectangle having angled corners, and thus includes a shape resembling an oval. The cross-sectional area S of the filament 10C is in the range of 0.09 to 0.20 sq.mm. The aspect ratio H/W of the filament 10C is in the range of from 0.65 to 0.95.

In this example, the filament 10C is waved by bending zigzag on a surface normal to the major axis, that is, normal to the face of the ply. Thus, the waving is two-dimensional. The wave pitch P1 is in the range of not less than 5.0 mm, preferably from 10.0 to 50 mm. The wave height h1 is in the range of from 0.002 to 0.02 times the wave pitch P1.

Each ply 7a, 7b is formed such that the product S×N of the cross-sectional area S (sq.mm) of a filament 10C or a cord and the cord count N per 5 cm width of the ply is in the range of from 4.0 to 6.5.

Comparison Test

Test tires of size 175/70R13 having the structure shown in FIG. 1 and specifications shown in Table 2 were made and tested for the tire weight (1), durability (2), steering stability (3) and ride comfort (4) as explained as above. The test results are shown in Table 2.

TABLE 2

| Tire | Pr.B1 | Ref.B1 | Ref.B2 | Ref.B3 | Ref.B4 | Ref.B5 | Ex.B1 | Ex.B2 |
| --- | --- | --- | --- | --- | --- | --- | --- | --- |
| Breaker cord | multi | mono | mono | mono | mono | mono | mono | mono |
| Number of filament | 5 | 1 | 1 | 1 | 1 | 1 | 1 | 1 |
| Filament | | | | | | | | |
| Sectional shape | circle | circle | circle | rect. | rect. | rect. | rect. | rect. |
| H (mm) | 0.25 | 0.38 | 0.42 | 0.41 | 0.3 | 0.37 | 0.34 | 0.37 |
| W (mm) | 0.25 | 0.38 | 0.42 | 0.42 | 0.5 | 0.44 | 0.4 | 0.44 |
| H/W | 1 | 1 | 1 | 0.98 | 0.6 | 0.84 | 0.85 | 0.84 |
| Waving | — | spiral | spiral | 2-D wave | 2-D wave | 2-D wave | 2-D wave | 2-D wave |
| P1 (mm) | — | 18 | 20 | 8 | 20 | 20 | 19 | 5 |
| h1 (mm) | — | 0.16 | 0.18 | 0.18 | 0.18 | 0.45 | 0.18 | 0.05 |
| P1/h1 | — | 0.009 | 0.009 | 0.023 | 0.009 | 0.023 | 0.009 | 0.01 |
| Sectional area S (sq.mm) | 0.2454 | 0.1134 | 0.1385 | 0.1385 | 0.1385 | 0.1385 | 0.1134 | 0.1385 |
| Cord strength (N) | 638 | 352 | 416 | 415 | 388 | 390 | 346 | 410 |
| Srength/section area (N/sq.mm) | 2600 | 3100 | 3000 | 2995 | 2800 | 2816 | 3050 | 2960 |
| Cord count/5 cm ply width | 35 | 40 | 40 | 40 | 40 | 40 | 40 | 40 |
| Tire weight | 100 | 91 | 93 | 93 | 93 | 93 | 91 | 93 |
| Durability | 100 | 160 | 40 | 43 | 200 | 220 | 96 | 91 |
| Steering stability | 7 | 4 | 8 | 8 | 9 | 9 | 8 | 9 |
| Ride comfort | 7 | 8 | 8 | 8 | 9 | 8 | 10 | 10 |

| Tire | Ex.B3 | Ex.B4 | Ex.B5 | Ex.B6 | Ex.B7 | Ex.B8 | Ex.B9 |
| --- | --- | --- | --- | --- | --- | --- | --- |
| Breaker cord | mono | mono | mono | mono | mono | mono | mono |
| Number of filament | 1 | 1 | 1 | 1 | 1 | 1 | 1 |
| Filament | | | | | | | |
| Sectional shape | rect. | rect. | rect. | rect. | rect. | rect. | rect. |
| H (mm) | 0.37 | 0.37 | 0.37 | 0.39 | 0.32 | 0.4 | 0.44 |
| W (mm) | 0.44 | 0.44 | 0.44 | 0.42 | 0.48 | 0.47 | 0.52 |
| H/W | 0.84 | 0.84 | 0.84 | 0.93 | 0.67 | 0.85 | 0.85 |
| Waving | 2-D wave | 2-D wave | 2-D wave | 2-D wave | 2-D wave | 2-D wave | 2-D wave |
| P1 (mm) | 20 | 20 | 35 | 20 | 20 | 21 | 24 |
| h1 (mm) | 0.18 | 0.38 | 0.3 | 0.18 | 0.18 | 0.19 | 0.21 |
| P1/h1 | 0.009 | 0.019 | 0.009 | 0.009 | 0.009 | 0.009 | 0.009 |
| Sectional area S (sq.mm) | 0.1385 | 0.1385 | 0.1385 | 0.1385 | 0.1385 | 0.159 | 0.1963 |
| Cord strength (N) | 410 | 402 | 423 | 413 | 402 | 469 | 569 |
| Srength/section area (N/sq.mm) | 2960 | 2900 | 3055 | 2980 | 2900 | 2950 | 2900 |
| Cord count/5 cm ply width | 40 | 40 | 40 | 40 | 40 | 36 | 30 |
| Tire weight | 93 | 93 | 93 | 93 | 93 | 94 | 95 |
| Durability | 38 | 102 | 35 | 37 | 110 | 53 | 82 |
| Steering stability | 10 | 10 | 10 | 9 | 10 | 10 | 10 |
| Ride comfort | 10 | 10 | 10 | 9 | 10 | 9 | 8 |

Fourth Breaker Example

Figure 10:
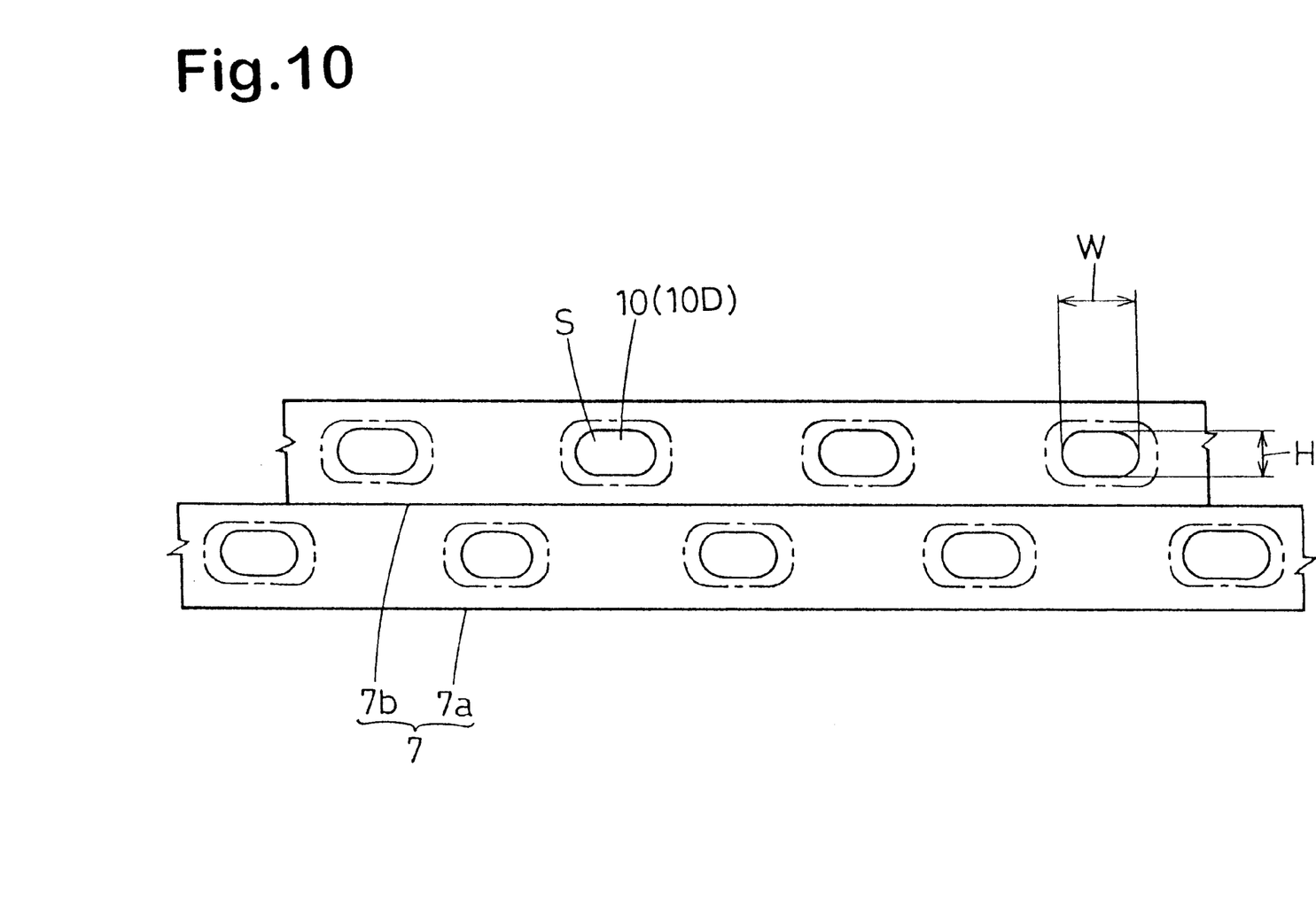
FIG. 10 is a cross sectional view of still more another example of the breaker.
Figure 11:
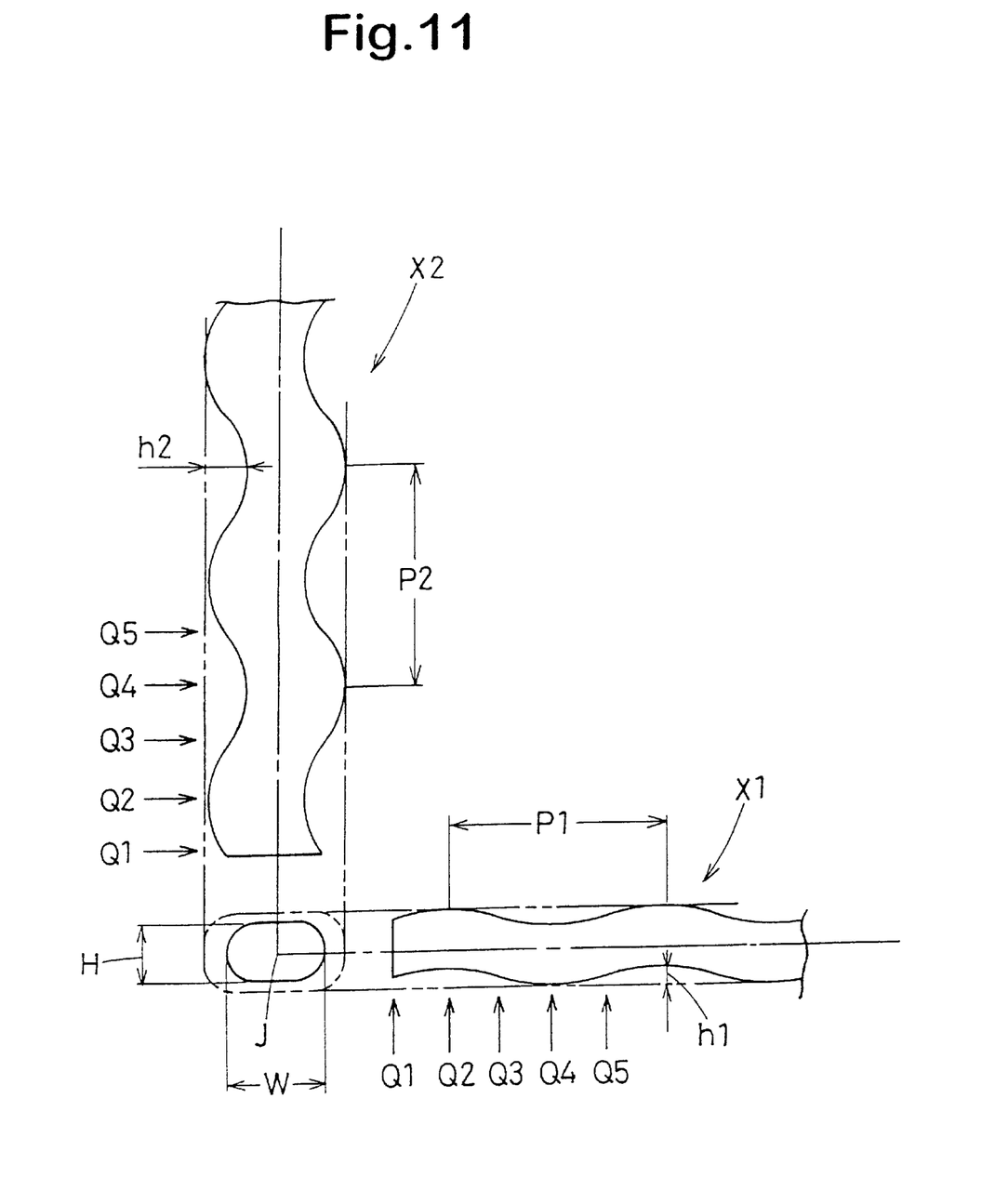
FIG. 11 is a diagram for explaining the orthogonal waving of the cord thereof.

FIG. 10 show a fourth example of the breaker. FIG. 11 shows a fourth example of the breaker cord 10 which is composed of a filament 10D having a rectangular sectional shape whose minor axis and major axis lie along the tire radial direction and a normal direction thereto, respectively. Here, the "rectangular shape" is used in the same sense as in the third example. The cross-sectional area S of the filament 10D is in the range of 0.09 to 0.20 sg.mm. The aspect ratio H/W of the filament 10D is in the range of from 0.65 to 0.95.

In this example, the filament 10D is waved by bending zigzag on a surface normal to the major axis, that is, normal to the face of the ply. (hereinafter, minor-axis waving X1) Further, the filament 10D is waved by bending zigzag on a surface normal to the minor axis, that is, parallel to the face of the ply. (hereinafter, major-axis waving X2) That is, the filament 10D is waved on the two orthogonal surfaces. (hereinafter, orthogonal waving)

In the minor-axis waving X1, the wave pitch P1 is set in the range of not less than 3.0 mm, and the waving height h1 is set in the range of from 0.002 to 0.05 times the wave pitch P1. In the major-axis waving X2, the wave pitch P2 is set in the range of not less than 5.0 mm, and the waving height h2 is set in the range of from 0.002 to 0.05 times the wave pitch P2.

The pitches P1 and P2 are substantially the same in FIG. 11, but they can be different from each other. Preferably, the pitches P1 and P2 are set in the range of from 10.0 to 50 mm.

Each ply 7a, 7b is formed such that the product S×N of the cross-sectional area S (sq.mm) of a filament 10D or a cord and the cord count N per 5 cm width of the ply is in the range of from 4.0 to 6.5.

Comparison Test

Test tires of size 195/65R15 having the structure shown in FIG. 2 and specifications shown in Table 3 were made and tested for noise (6) in addition to the above-explained tire weight (1), durability (2), steering stability (3) and ride comfort (4). The test results are shown in Table 3.

(6) Noise

During coasting the passenger car on a smooth asphalt road at a speed of 50 km/h, the noise level in dB(A) was measured near the driver's ears. The resulta are indicated by an index based on Prior art tire (Pr.C1) being 100. The smaller the index, the better the noise.

TABLE 3

| Tire | Ex.C3 | Ex.C4 | Ex.C5 | Ex.C6 | Ex.C7 | Ex.C8 | Ex.C9 | Ex.C10 | Ex.C11 | Ex.C12 |
|---|---|---|---|---|---|---|---|---|---|---|
| Breaker cord | mono | mono | mono | mono | mono | mono | mono | mono | mono | mono |
| Number of filament | 1 | 1 | 1 | 1 | 1 | 1 | 1 | 1 | 1 | 1 |
| Filament Sectional shape | rect. | rect. | rect. | rect. | rect. | rect. | rect. | rect. | rect. | rect. |
| H (mm) | 0.37 | 0.37 | 0.37 | 0.37 | 0.37 | 0.37 | 0.39 | 0.32 | 0.4 | 0.44 |
| W (mm) | 0.44 | 0.44 | 0.44 | 0.44 | 0.44 | 0.44 | 0.42 | 0.48 | 0.47 | 0.52 |
| H/W | 0.84 | 0.84 | 0.84 | 0.84 | 0.84 | 0.84 | 0.93 | 0.67 | 0.85 | 0.85 |
| Waving | orthogonal | orthogonal | orthogonal | orthogonal | orthogonal | orthogonal | orthogonal | orthogonal | orthogonal | orthogonal |
| Minor axis waving | | | | | | | | | | |
| P1 | 20 | 20 | 20 | 20 | 20 | 35 | 20 | 20 | 21 | 24 |
| h1 | 0.18 | 0.18 | 0.18 | 0.18 | 0.8 | 0.3 | 0.18 | 0.18 | 0.18 | 0.21 |
| h1/P1 | 0.009 | 0.009 | 0.009 | 0.009 | 0.04 | 0.009 | 0.009 | 0.009 | 0.009 | 0.009 |
| Major axis waving | | | | | | | | | | |
| P2 | 20 | 20 | 20 | 20 | 20 | 35 | 20 | 20 | 21 | 24 |
| h2 | 0.18 | 0.18 | 0.18 | 0.18 | 0.18 | 0.3 | 0.18 | 0.18 | 0.19 | 0.21 |
| h2/P2 | 0.009 | 0.009 | 0.009 | 0.009 | 0.009 | 0.009 | 0.009 | 0.009 | 0.009 | 0.009 |
| Sectional area S (sq.mm) | 0.1385 | 0.1385 | 0.1385 | 0.1385 | 0.1385 | 0.1385 | 0.1385 | 0.1385 | 0.159 | 0.1963 |
| Cord strength (N) | 406 | 406 | 406 | 406 | 386 | 415 | 401 | 394 | 455 | 558 |
| Strength/section area (N/sq.mm) | 2960 | 2960 | 2960 | 2960 | 2900 | 3055 | 2980 | 2900 | 2950 | 2900 |
| Cord count/5 cm | 40 | 40 | 40 | 40 | 40 | 40 | 40 | 40 | 36 | 30 |
| Band | none | present | present | present | none | none | none | none | none | none |
| Band cord | | | | | | | | | | |
| Material | — | nylon | PET | aramide | — | — | — | — | — | — |
| Tire weight | 93 | 93 | 93 | 93 | 94 | 94 | 94 | 93 | 95 | 96 |
| Durability | 20 | 20 | 20 | 20 | 93 | 18 | 20 | 98 | 41 | 65 |
| Steering stabihty | 10 | 10 | 10 | 10 | 9 | 10 | 9 | 10 | 10 | 10 |
| Ride comfort | 10 | 10 | 10 | 10 | 10 | 10 | 10 | 10 | 10 | 9 |
| Noise | 98.1 | 96.9 | 96.2 | 94.9 | 98.4 | 98 | 98.1 | 98.3 | 97.7 | 97 |

| Tire | Pr.C1 | Ref.C1 | Ref.C2 | Ref.C3 | Ref.C4 | Ref.C5 | Ref.C6 | Ex.C1 | Ex.C2 |
|---|---|---|---|---|---|---|---|---|---|
| Breaker cord | multi | mono | mono | mono | mono | mono | mono | mono | mono |
| Number of filament | 5 | 1 | 1 | 1 | 1 | 1 | 1 | 1 | 1 |
| Filament Sectional shape | circle | circle | circle | rect. | rect. | rect. | rect. | rect. | rect. |
| H (mm) | 0.25 | 0.38 | 0.42 | 0.41 | 0.3 | 0.37 | 0.37 | 0.34 | 0.37 |
| W (mm) | 0.25 | 0.38 | 0.42 | 0.42 | 0.5 | 0.44 | 0.44 | 0.4 | 0.44 |
| H/W | 1 | 1 | 1 | 0.98 | 0.6 | 0.84 | 0.84 | 0.85 | 0.84 |
| Waving | — | spiral | spiral | orthogonal | orthogonal | orthogonal | orthogonal | orthogonal | orthogonal |
| Minor axis waving | | | | | | | | | |
| P1 | — | 18 | 20 | 20 | 20 | 2 | 2 | 19 | 3 |
| h1 | — | 0.16 | 0.18 | 0.18 | 0.18 | 0.08 | 0.12 | 0.18 | 0.03 |
| h1/P1 | — | 0.009 | 0.009 | 0.009 | 0.009 | 0.04 | 0.06 | 0.009 | 0.01 |

TABLE 3-continued

| Major axis waving | | | | | | | | | |
|---|---|---|---|---|---|---|---|---|---|
| P2 | — | 18 | 20 | 20 | 20 | 4 | 4 | 19 | 5 |
| h2 | — | 0.16 | 0.18 | 0.18 | 0.18 | 0.18 | 0.24 | 0.18 | 0.05 |
| h2/P2 | — | 0.009 | 0.009 | 0.009 | 0.009 | 0.045 | 0.06 | 0.009 | 0.01 |
| Sectional area S (sq.mm) | 0.2454 | 0.1134 | 0.1385 | 0.1385 | 0.1385 | 0.1385 | 0.1385 | 0.1134 | 0.1385 |
| Cord strength (N) | 638 | 352 | 416 | 407 | 376 | 395 | 361 | 332 | 398 |
| Strength/section area (N/sq.mm) | 2600 | 3100 | 3000 | 2995 | 2800 | 2853 | 2610 | 3050 | 2874 |
| Cord count/5 cm | 35 | 40 | 40 | 40 | 40 | 40 | 40 | 40 | 40 |
| Band | none | none | none | none | none | none | none | none | none |
| Band cord | | | | | | | | | |
| Material | — | — | — | — | — | — | — | — | — |
| Tire weight | 100o | 91 | 93 | 94 | 94 | 93 | 93 | 91 | 94 |
| Durability | 100 | 160 | 40 | 40 | 187 | 213 | 235 | 92 | 85 |
| Steering stability | 7 | 4 | 8 | 7 | 8 | 7 | 6 | 8 | 9 |
| Ride comfort | 7 | 8 | 8 | 8 | 9 | 7 | 8 | 10 | 10 |
| Noise | 100 | 98.8 | 98.4 | 98.2 | 98.4 | 98.6 | 98.8 | 98.6 | 98 |

In the third and fourth examples of the breaker, the monofilament cords 10 are arranged such that the major axes lie along the thickness center plane or surface of the ply. Accordingly, with respect to the axial direction of the tire, an effect similar to that by an increased cord count can be obtained, and the in-plane rigidity of the ply increases. Therefore, the cornering power and steering stability can be improved. On the other hand, with respect to the radial direction of the tire, the cords do not exert such effect. Thus, the out-of-plane rigidity of the ply is not increased. Therefore, the ride comfort is improved.

In contrast with the spiral waving, the orthogonally waved cord has no twist back when the cord is elongated, and the direction of the major axis remains unchanged. Thus, separation between the cord and topping rubber can be prevented.

In the third and fourth examples of the breaker: If the aspect ratio H/W is more than 0.95, the steering stability and ride comfort deteriorate. If the aspect ratio H/W is less than 0.65, the cord strength is liable to decrease during processing.

If the cross-sectional area S is less than 0.09 sq.mm, the cord rigidity and strength become insufficient, the belt can not provide an essential cornering power and the steering stability deteriorates. If the cross-sectional area S is more than 0.20 sq.mm, the cord rigidity excessively increases, and the ride comfort deteriorate. Further, the residual stress increases, and the durability decreases.

If the wave pitch P1 is less than 5 mm, the cord durability is decreased by deformation during running.

If the wave height h1 is more than 0.02 times the pitch P1, the cord strength and fatigue resistance are decreased.

If the pitch P1 is more than 50 mm and/or the wave height h1 is less than 0.002 times the pitch P1, the cord lacks its elongation.

In the fourth example of the breaker:
If the wave pitch P1 is less than 3.0 mm and the wave pitch P2 less than 5.0 mm, the cord durability is decreased by deformation during running.
If the wave pitches P1 and P2 are more than 50 mm, the advantageous effect from the waving can not be obtained.
If the wave height h1 is more than 0.05 times the pitch P1 and the waving height h2 is more than 0.05 times the pitch P2, the cord strength and fatigue resistance decrease.

Method of Making the Orthogonally Waved Cord

Figure 12:
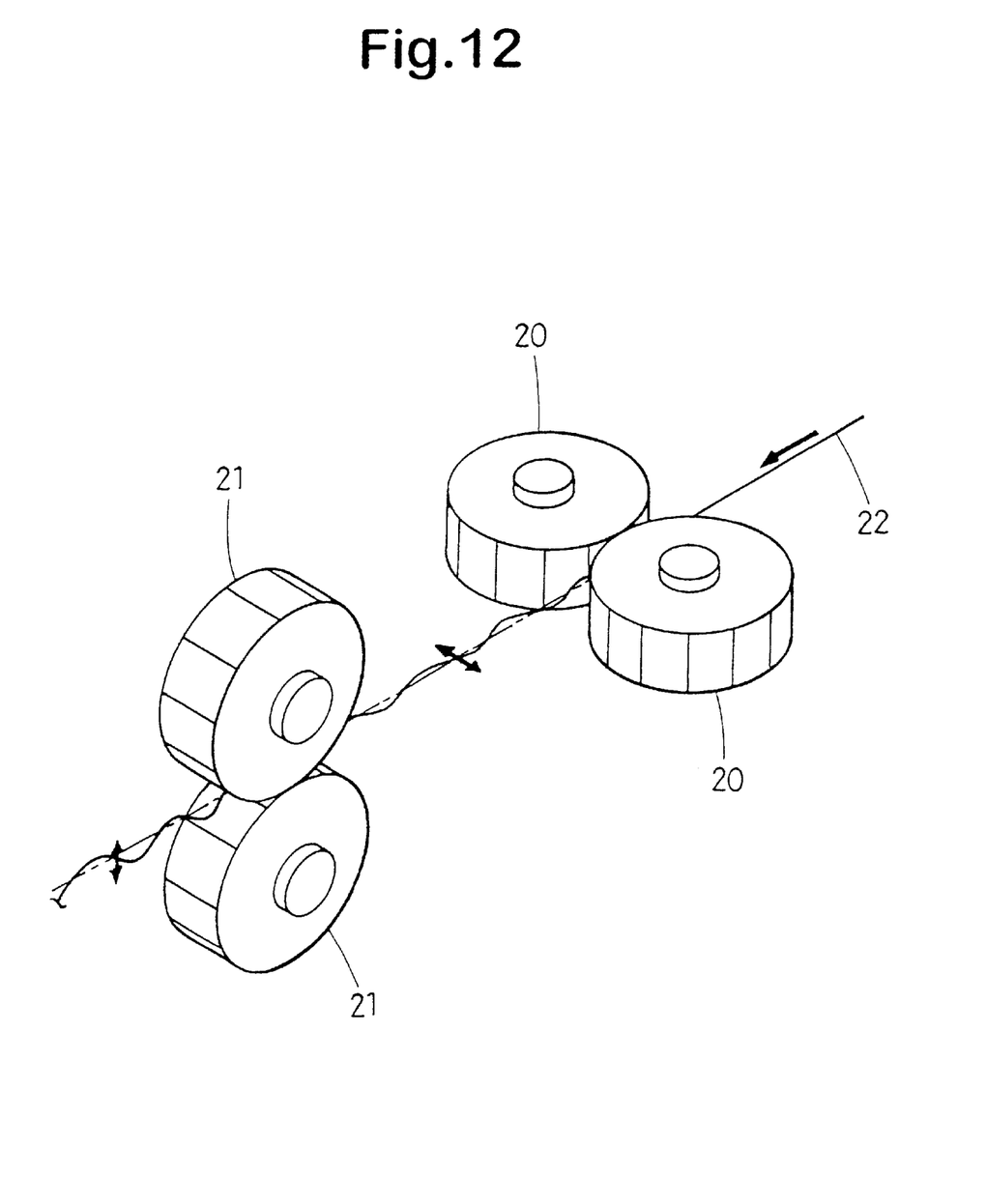
FIG. 12 is a diagram for explaining a method of waving the cord shown in FIG. 11.

FIG. 12 shows a method of making the cord shown in FIG. 11. First, a material steel wire 22 having a circular cross sectional shape is waved by passing through between a pair of rolls 20 having a waved circumference like a cogwheel.

Then, the wire 22 is again waved by passing through between a pair of rolls 21 having a waved circumference like a cogwheel. The rolls 21 are arranged orthogonally to the rolls 21, and flaten the circular cross sectional shape into a rectangular shape.

In the present invention, all the cords in each of the ply 7a and 7b have the same cord specifications. However, between one ply 7a and the other ply 7b, the cord specifications, for example sectional shape, size, wave pitch and/or wave height may be changed, but preferably the same specifications are employed. In each ply, all the cords are the same wave pitch, but it is preferable that the phase of wave gradually shift from a cord at one end to a cord at the other end of the ply at a substantially constant rate.

As explained above, according to the present invention, as the monofilament cord is waved, an elongation of the cord under load increases. Accordingly, an excessive increase in the belt rigidity is controlled and deterioration of ride comfort can be prevented. Further, the breaking of the cord is decreased and the belt durability can be improved. Thus, it becomes possible to use a monofilament steel cord as a breaker cord, and as a result, the amount of steel can be decreased to 80% or lower while maintaining the belt rigidity and thereby maintaining the cornering power, steering stability and the like.

What is claimed is:

1. A pneumatic tire comprising
   a belt disposed radially outside a carcass in a tread portion,
   the belt comprising two cross plies of monofilament metallic cords laid at angles of from 15 to 30 degrees with respect to the circumferential direction of the tire,
   each said monofilament metallic cord composed of a waved single filament,
   the filament having
      a circular sectional shape having a diameter in a range of from 0.40 to 0.50 mm, or alternatively
      a non-circular sectional shape having an aspect ratio in a range of from 0.65 to 0.95 and a cross-sectional area in a range of 0.09 to 0.20 sq. mm, wherein
   the filament has a circular sectional shape,
   the wave of the filament has
      a wave pitch of not less than 14.0 mm and
      a wave height of 0.002 to 0.02 times the wave pitch, each of the two cross plies has rigidity index BM in a range of from 100 to 300, wherein the rigidity index BM is defined as the product (M×N×L) of a bending rigidity M(g·cm) of the monofilament metallic cord, a cord count N per 5 cm width of the ply, and a distance L (cm) between the cord center of one of the plies to that of the other.

2. The pneumatic tire according to claim 1, wherein the monofilament metallic cord has a rupture strength of not less than 3300 N/sq·mm.

3. The pneumatic tire according to claim 1, wherein a band made of at least one organic fiber cord of which cord angle is less than 10 degrees with respect to the circumferential direction of the tire is disposed radially outside said two cross plies.

4. The pneumatic tire according to claim 3, wherein said band is composed of spiral windings of said at least one organic fiber cord.

5. The pneumatic tire according to claim 4, wherein said at least one organic fiber cord is one of the following cords: an aliphatic polyamide fiber cord, an aromatic polyamide fiber cord, a polyvinylalcohol fiber cord, a polyethylene terephthalate fiber cord, a polyethylene naphthalate fiber cord, and a hybrid cord of aliphatic polyamide fiber and aromatic polyamide fiber.

6. The pneumatic tire according to claim 3, wherein said at least one organic fiber cord is one of the following cords: an aliphatic polyamide fiber cord, an aromatic polyamide fiber cord, a polyvinylalcohol fiber cord, a polyethylene terephthalate fiber cord, a polyethylene naphthalate fiber cord, and a hybrid cord of aliphatic polyamide fiber and aromatic polyamide fiber.

* * * * *